S. S. JACKSON.
PICK FINDER DEVICE FOR LOOMS.
APPLICATION FILED JULY 13, 1909.

1,041,089.

Patented Oct. 15, 1912.
5 SHEETS—SHEET 1.

Witnesses:
Oscar F. Hill
Edith J. Anderson

Inventor:
Simeon Schoon Jackson
by Chas. F. Randall
Attorney.

S. S. JACKSON.
PICK FINDER DEVICE FOR LOOMS.
APPLICATION FILED JULY 13, 1909.

1,041,089.

Patented Oct. 15, 1912.

Witnesses:
Oscar F. Hill
Aenn F. Randall

Inventor:
Simeon Schoon Jackson
by Chas. F. Randall
Attorney.

UNITED STATES PATENT OFFICE.

SIMEON SCHOON JACKSON, OF READVILLE, MASSACHUSETTS, ASSIGNOR TO THE STAFFORD COMPANY, OF READVILLE, MASSACHUSETTS, A CORPORATION OF NEW JERSEY.

PICK-FINDER DEVICE FOR LOOMS.

1,041,089.  Specification of Letters Patent.  Patented Oct. 15, 1912.

Application filed July 13, 1909. Serial No. 507,304.

*To all whom it may concern:*

Be it known that I, SIMEON SCHOON JACKSON, a subject of Great Britain, residing at Readville, in the county of Norfolk, State of Massachusetts, have invented a certain new and useful Improvement in Pick-Finder Devices for Looms, of which the following is a specification, reference being had therein to the accompanying drawings.

The invention consists in improved pick-finder devices for looms, for the purpose of minimizing the occurrence of faults in the cloth in the weaving, arranged to be called into action upon detection of predetermined deficiency in the working supply of weft or filling, and constructed and combined to operate to cause the first pick of weft or filling after correction of such deficiency to be laid in the proper shed to avoid a break in the pattern of the cloth.

It comprises devices capable of being used in looms employing four harnesses that are caused to operate in regular succession in opening the required sheds for the weaving operations, and in its more complete embodiment comprises a general combination including devices detecting for picks in both directions, and means for causing the first pick after correction of the deficiency to be introduced into the proper shed to receive it, in whichever direction of pick the deficiency became apparent, the said general combination also being of a character especially fitting it for employment with four harnesses.

Pick-finder devices embodying the invention are designed to be operatively correlated and combined with other mechanism in a loom to trip automatic weft-replenishing instrumentalities into action, or to automatically trip the shipper-devices of the loom to cause the driving-power to be unshipped to arrest the weaving action, or to trip the said instrumentalities into action, and in addition trip the shipper-devices so that the replenishing operations may be performed while the weaving operations are suspended, the loom being automatically restarted on the completion of the replenishing operations.

Embodiments of the invention may be variously constructed, arranged, and combined.

In the drawings, Fig. 4 is a view in section on line 4, 4, in Figs. 2 and 3, looking in the direction indicated by the arrows at the ends of such line. Fig. 5 is a view in section on line 5, 5, of Figs. 2 and 3, looking in the direction indicated by the arrows at the ends of such line. Fig. 5$^a$ is a view of arm 38, detached. Fig. 6 is a view in elevation looking from the left-hand side in Figs. 2 and 3.

Figures 1, 7, 8:
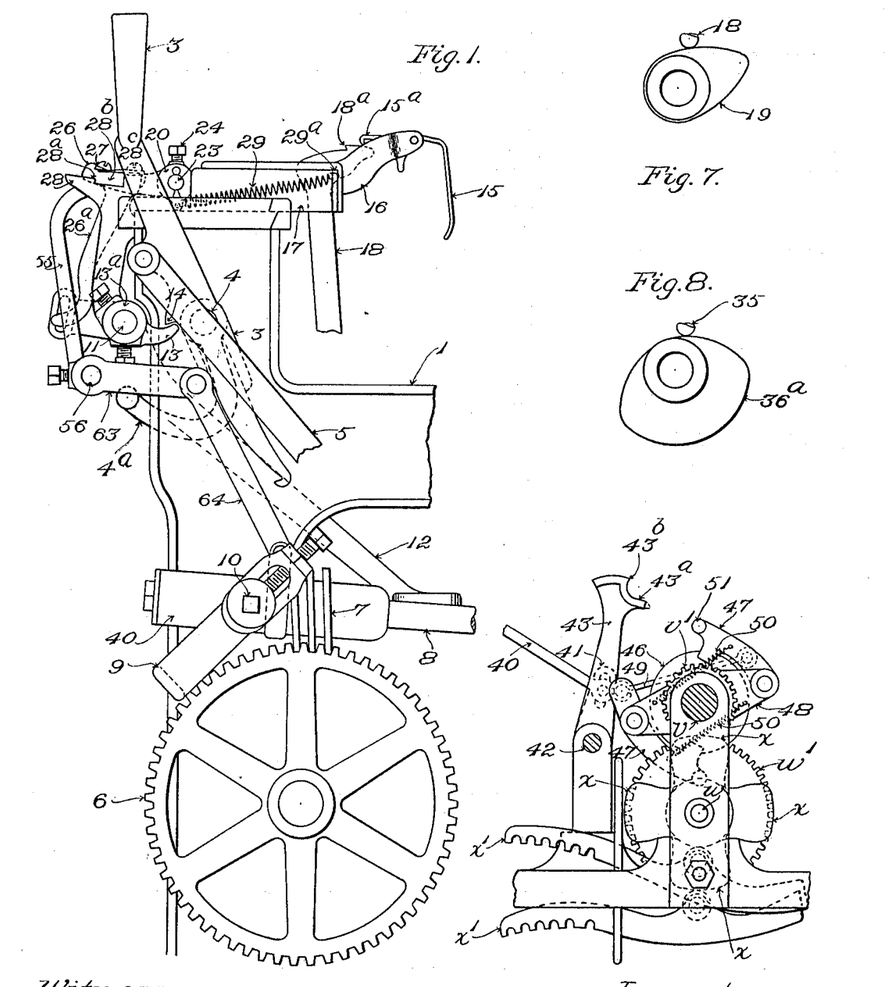
—Figure 1 shows in side elevation portions of a loom having an embodiment of the invention applied thereto.
Figs. 7 and 8 are views of the actuating cams for the weft-hammers or goosenecks.
Figure 2:
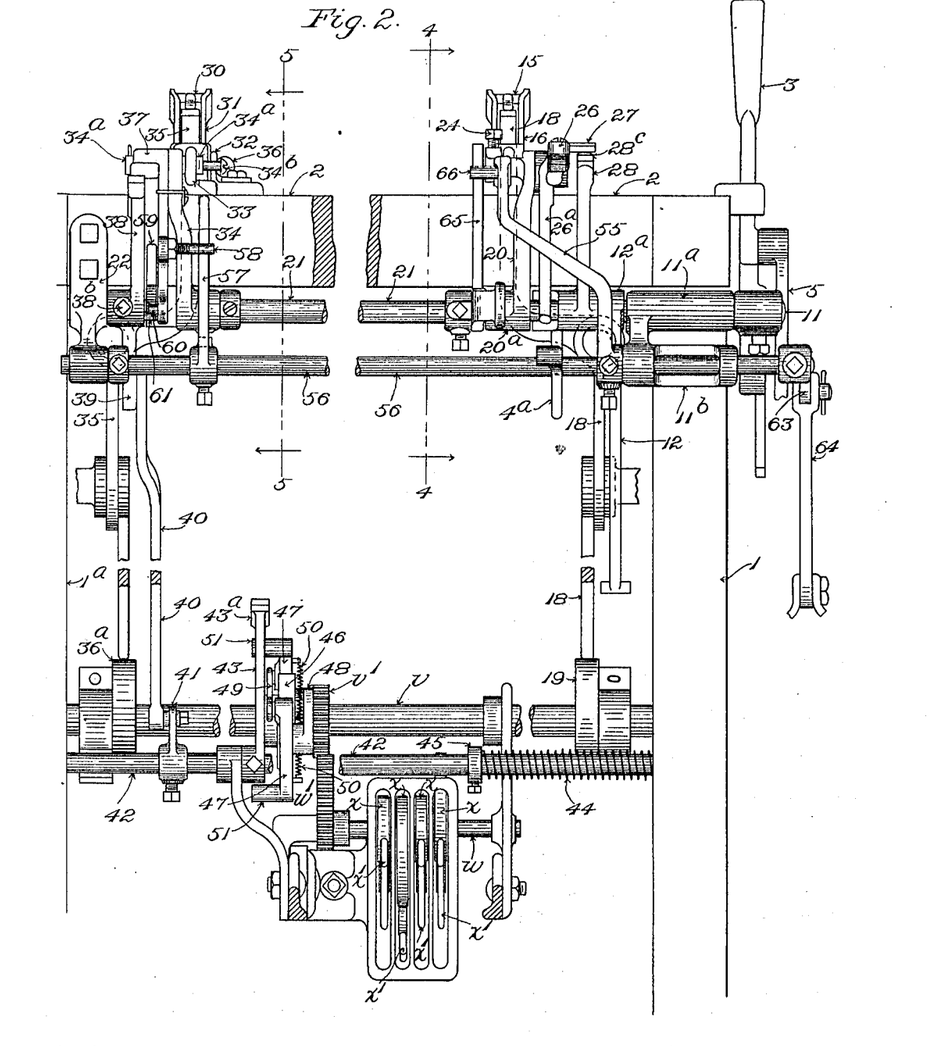
Fig. 2 shows the same in front elevation.
Figure 3:
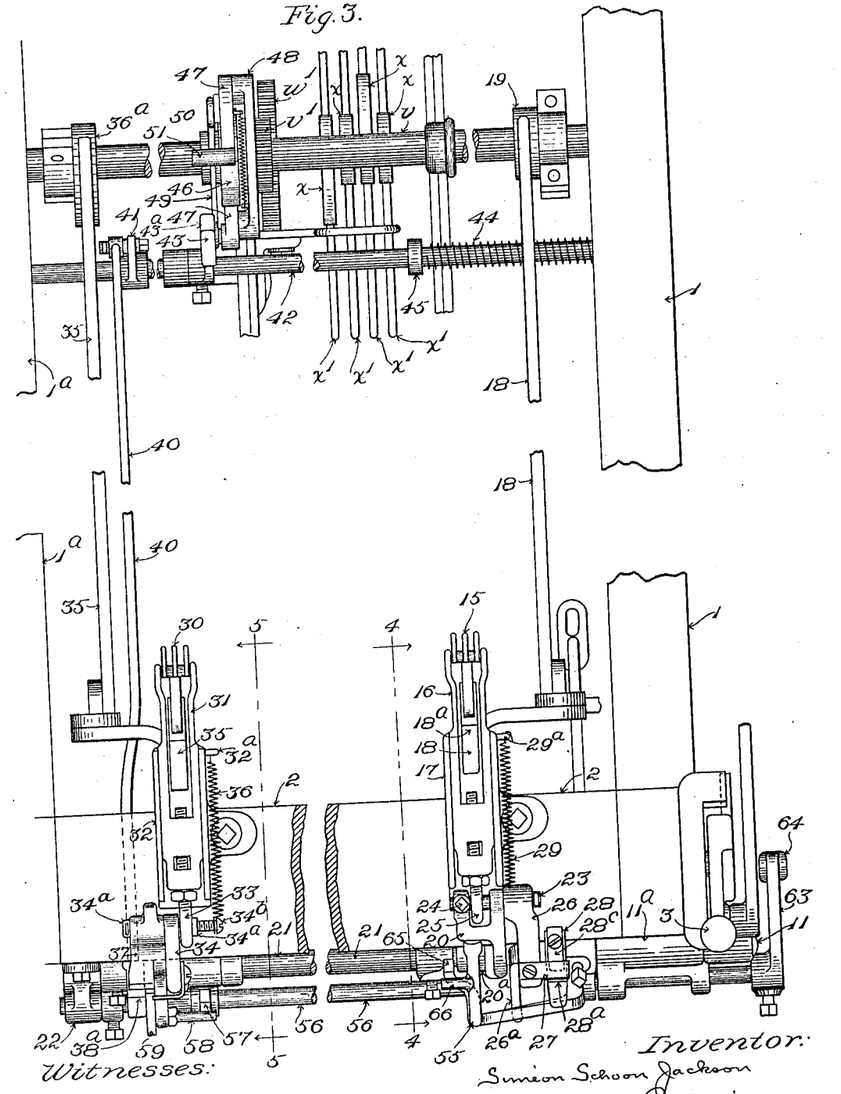
Fig. 3 shows the same in plan.

Having reference to the drawings,—portions of the opposite side-frames 1, 1$^a$, of a loom are shown. Portions of the breast-beam are represented at 2, 2. For the purpose of indicating the relation between the devices in which the invention more immediately resides and the power-controlling devices of the loom, a shipper-handle is represented at 3, the shipper-rockshaft on which the said shipper-handle is fixed being shown at 4, and at 5 in Figs. 1, 2 and 3 is shown a portion of the length of the rod through which the power-shipping and brake-devices (not shown) are more immediately controlled from the shipper-handle. The shipper-handle in Figs. 1 to 4 is in the position that is occupied thereby while the power is applied and the loom is running. To assist in indicating one way in which the taking-up of the woven cloth may be arrested, and the letting-back of the cloth may be effected, when the weft-detectors which are employed ascertain weft-deficiency, the worm-gear of the take-up mechanism is shown at 6, Fig. 1, its actuator-worm at 7, the rotating shaft on which such worm is fixed being shown at 8, a detent and let-back pawl of known construction being shown at 9, and the supporting-stud for such pawl at 10, the said supporting-stud being carried by the bearing 40 for the front end of the worm-shaft 8.

At 11 is a tripping rockshaft through which are tripped into action the instrumentalities that are utilized to produce the required change in the action of the loom. It is shown supported by a long bearing 11ª, Figs. 2 and 3, forming part of a stand 11 that is attached to the front of the side-frame 1ª. By way of indicating its control of the weft-replenishing instrumentalities, the said tripping rockshaft is shown provided with a finger 12, which is fixedly mounted by means of its hub or sleeve 12ª upon the inner end of the rockshaft, at the inner end of the said bearing. The finger is operatively combined in practice with the devices for automatically effecting replenishment of the working weft-supply, so that when the tripping rockshaft and finger are turned the said devices are called into action and thereby the automatic replenishment is brought about. The precise character of the weft-replenishing devices, and mode of operation thereof, are not material so far as the broad principles of the invention are concerned, since such broad principles admit of being employed in connection with various known types and constructions of such devices, whether contrived to effect replenishment by insertion of a fresh weft-supply into a working shuttle on the lay of a loom, or by replacement of a spent or failed working shuttle by a fresh one. By way of indicating the control of the tripping rockshaft 11 over the driving and brake mechanism of the loom, it is shown provided also, with a lug 13, Fig. 1, fixed by means of its hub 13ª upon the outer end of the rockshaft, at the outer side of bearing 11ª, and arranged to engage a lug or shoulder 14 on the shipper-handle 3. By reason of such engagement, forward turning movement of the tripping rockshaft acts through the lugs 13 and 14 to operate the shipper-handle so as to unship the driving-power of the loom, apply the brake, and stop the weaving action. In some cases, the employment of automatic weft-replenishing devices may be dispensed with, and after the loom has been stopped by the turning of the tripping rockshaft the replenishment of the working weft-supply may be effectuated by hand and the loom be restarted by the weaver. So, also, in cases in which a dwell in the working of the loom is not required for the performance of the replenishing operations, the said turning movement may be utilized to call the replenishing instrumentalities into action without effecting unshipping of the driving-power and arrest of the weaving action. The particular arrangement of parts that is shown in the drawings is more especially designed for employment in a replenishing loom of the well-known type in which the movement of finger 12 operates to trip a so-called change-shaft into operation, at the same time that lug 13 trips the shipper-handle to unship the driving-power from the weaving instrumentalities and apply the brake to thereby suspend the weaving action, the change-shaft during its rotation actuating the various replenishing instrumentalities to occasion replenishment during the suspension of the weaving action, and finally acting to restore the shipper-handle to its former position and thereby relieving the brake-action and shipping-on the driving power to resume weaving, the change-shaft itself coming to rest. The side of the loom represented in Fig. 1, being that at which the shipper-handle 3 is located, is the driving side. The magazine (not shown) containing the reserve weft-supply is in practice located at the opposite side of the loom.

The drawings show an application of an embodiment of the invention to a two weft-fork loom, although the invention is not necessarily restricted in all instances to the employment of weft-forks as the weft-detectors.

15 is the weft-fork which detects for picks to the driving side of the loom, it being mounted pivotally upon the rear end of its carrying slide 16, and the latter being supported and guided by the stand 17 fixed upon the breast-beam adjacent the said side. 18 is the actuator (weft-hammer or gooseneck) that coöperates with the said fork 15, the said actuator having the shoulder 18ª which, when the fork 15 is not tilted by the presence of weft or filling between its tines and the corresponding grid of the lay, when the lay beats up after the pick to the driving-side, engages the tail 15ª of the said fork and moves the slide 16 forward in its guide-stand 17.

At 19 is the cam by which the actuator 18 is moved at the required times to feel for the tail of the fork 15.

The forward movement of the slide 16 is utilized for the actuation of a dog, which will presently be described, by which the tripping rockshaft is actuated. For the support of the said dog, and the transmission of movement thereto from the slide 16, an arm 20 is mounted by its hub 20ª (Figs. 2 and 3) loosely upon a rod or shaft 21 extending across the loom in line with the tripping rockshaft 11. One end of the said rod or shaft is supported by being entered into the bore of hub or sleeve 12ª of finger 12, and the other end thereof is supported by a bracket 22 that is attached to the breast-beam and has a bearing into which such end of the rod enters. The rearwardly-extending upper end of the arm 20 is branched, as shown in Fig. 3, the branches being separated transversely, and in holes made transversely through the two branches a pin 23 is mounted, the said pin being fixed in place by means of a clamping screw 24. The intermediate portion of the pin passes through the eye of the forwardly-projecting portion of an eye-bolt 25 having its threaded stem screwed into the front portion of the slide 16. The said eye-bolt constitutes a longitudinally-adjustable connection between the said slide and the pin and arm.

A portion of the length of the pin 23 projects at the outer side of the arm 20, and an arm 26 is hung pivotally thereon. This arm extends forward from the pin, and carries the tripping dog 27, the acting portion of which extends transversely outward above the upper end of an arm 28 rising from the hub or sleeve 12$^a$ which is fixed, as aforesaid, upon the tripping rockshaft 11. The hinged arm 26 has a downwardly-projecting finger 26$^a$. Forwardly-acting pressure applied to this finger operates to tilt the arm 26 so as to swing the tripping dog 27 upward relative to the upper end of arm 28. A contracting spiral spring 29, having its rear extremity engaged with a lateral ear 29$^a$ on the rear end of guide-stand 17 and its forward extremity engaged with a downwardly-extending ear of the hub-portion of arm 26, aids gravity in causing the said arm and dog to tend to swing downward, and also acts with a tendency to draw the weft-fork-carrying slide 16 rearward and hold arm 20 in contact with the front surface of the breast-beam. The upper end of the arm 28 is formed with a shoulder 28$^a$, at the rear of which is a pocket 28$^b$, the said pocket being partly covered by a lip 28$^c$ constituted by a strip of metal which is fastened to the top of the said arm at the rear of the pocket and projects forward over the latter. The clearance between the front end of the lip and the shoulder is sufficient to permit the dog 27 to pass in and out beneath the lip by relative forward and rearward movement, and the depth of the pocket at the rear of the shoulder 28$^a$ is sufficient to accommodate the dog. Normally, the dog 27 rests upon the top of the lip 28$^c$.

The following is the mode of operation of the devices, associated with the weft-detector at the driving side of the loom, which have just been described. In case the predetermined weft-deficiency, in this instance breakage or complete exhaustion of the working supply of weft or filling, should present itself on the pick toward the driving side of the loom, through a given shed, the weft-fork 15 at such side would remain untilted, and the actuator (weft-hammer or gooseneck) 18 in its advance following such pick would engage with the tail of the said weft-fork, producing an advancing movement of the slide 16, arm 26, and dog 27. This advancing movement carries dog 27 forward off the front end of the lip 28$^c$, and the tension of spring 29 swings arm 26 downward so as to cause the dog to drop upon the nose of arm 28 in front of shoulder 28$^a$. As actuator 18 now moves rearward, spring 29 causes slide 16, arm 26, and dog 27 to move rearward also, the said dog passing under the front portion of the lip 28$^c$ and dropping into the pocket 28$^b$ behind the shoulder 28$^a$. The next shed being opened, the pick of the shuttle through such second shed from the driving-side to the magazine-side takes place, being pick No. 2, the actuator 18 remaining at rest in its rear position. Then follows the opening of a third shed and a pick through such shed from the magazine-side to the driving-side, being pick No. 3. The weft still being deficient (absent) the actuator 18, which is advanced following such pick, again engages with the weft-fork 15, and once more advances slide 16, arm 26, and dog 27. This advance causes the dog to engage with the shoulder 28$^a$, whereby the arm 28 is carried forward also. Through this movement of arm 28 the finger 12 is actuated to trip the weft-replenishing instrumentalities into action, and the tripping rockshaft 11 is actuated to trip the shipper-handle so as to unship the driving-power and apply the brake. The momentum or overthrow of the working parts of the loom produces the opening of a fourth shed and a pick of the shuttle through such shed from the driving-side to the magazine-side before the loom comes to rest, this pick being No. 4, and landing the shuttle in the shuttle-box at the magazine-side, in readiness for the performance of the replenishing operations. Replenishment having been effected, and the weaving action resumed, the first pick (being from the magazine-side) will be through the fifth shed, which is a repeat or reopening of the shed in which failure of weft or filling took place. Consequently the weaving will be resumed with the replenished weft-supply without break in the pattern.

Figures 4, 5, 5A, 6:
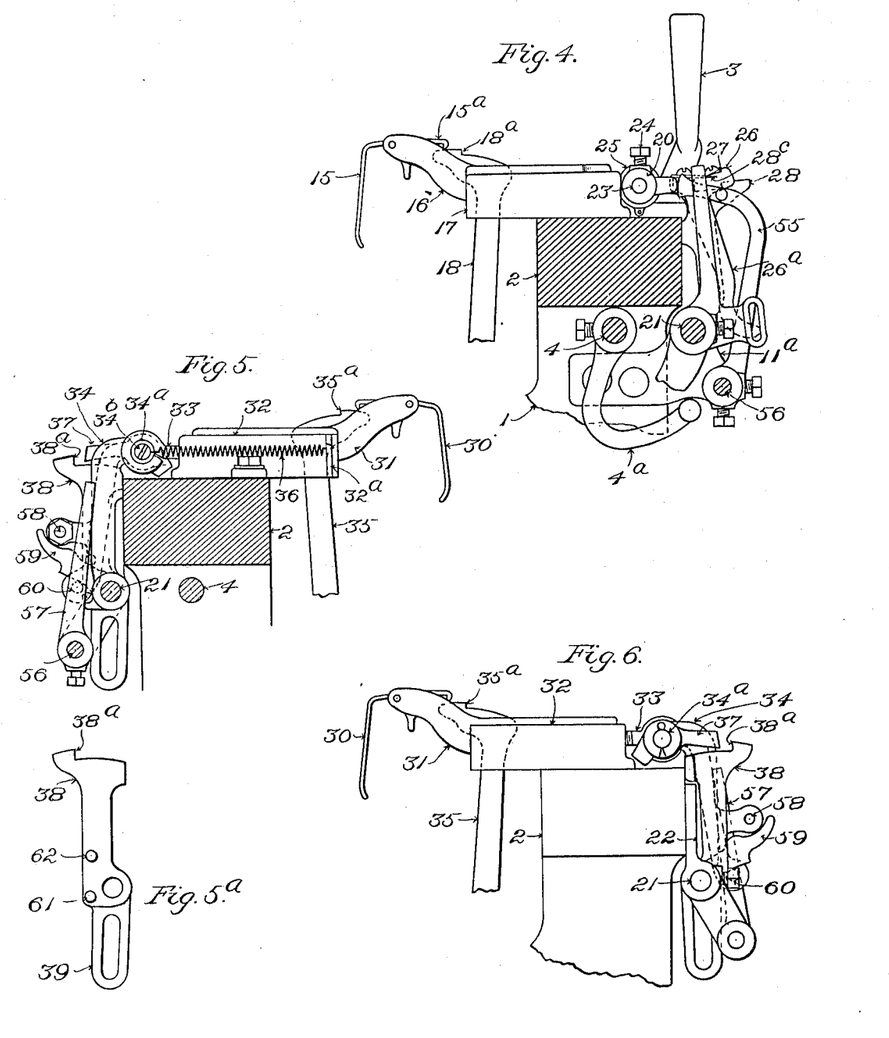
Figure 9:
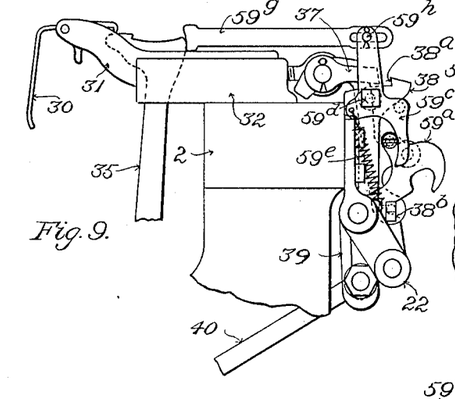
Fig. 9 is a side elevation of the devices at the magazine-side of the loom, with certain devices added to cause latch 59 to assume its normal position.
Figures 10, 13, 14, 15:
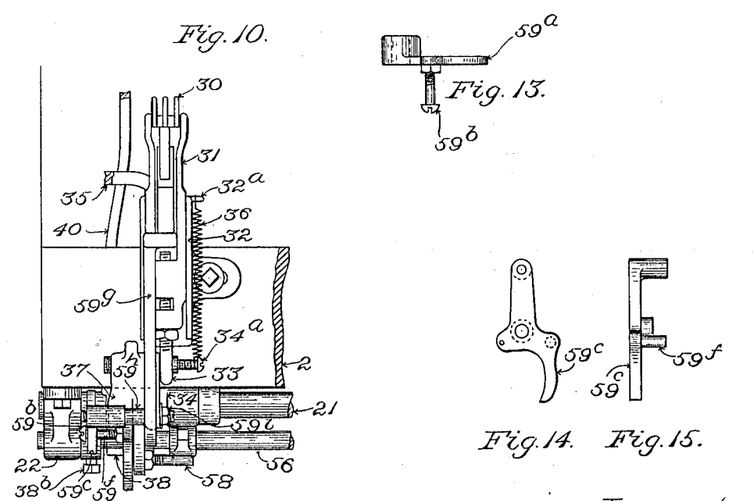
Fig. 10 is a plan of the parts shown in Fig. 9.
Figs. 12 and 13 are views of the latch of Figs. 9 to 11.
Figs. 14 and 15 are views of the return-lever of Figs. 9 to 11.
Figure 11:
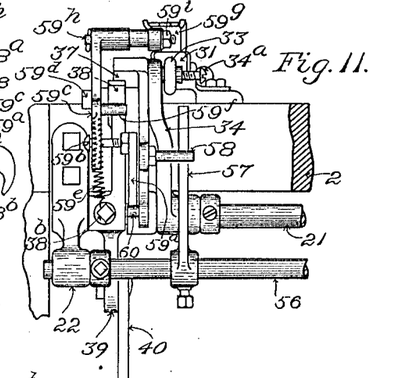
Fig. 11 is a front elevation thereof.
Figure 12:
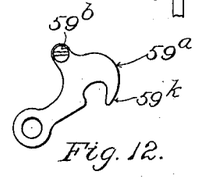

For the resumption of the weaving action the shipper-handle is returned to its position shown in Figs. 1, 2 and 3. Thereby the brake is taken off and the driving-power is shipped on. This return movement is utilized to restore the dog 27 to its starting position upon the top of the lip 28$^c$. To enable such restoration to be accomplished, a curved finger 4$^a$, Figs. 1, 2 and 4, having a transversely-broadened free extremity, is fixed upon the shipper rockshaft 4. The said finger is so set upon the said rockshaft that, while the shipper-handle is in the position occupied by it in Figs. 1 to 3, into which it is moved for the purpose of shipping-on the driving-power, and wherein it remains during the weaving action, the said broadened extremity is in a lowered and retracted position, clear of the finger 26$^a$ of the swinging arm 26 which carries the said dog 27. While the finger 4$^a$ occupies such position the finger 26$^a$ and arm 26 are free to swing downward without meeting with interference on the part of the finger 4ᵃ, and consequently the dog 27 is capable of dropping within the pocket 28ᵇ of arm 28, into position to engage with the shoulder 28ᵃ. When, however, the shipper-handle is moved to unship the driving-power so as to stop the weaving action, the turning of the shipper-rockshaft 4 will carry the finger 4ᵃ around so that its extremity will touch the finger 26ᵃ, and, in case arm 26 is down, and the dog within the pocket and in engagement with the shoulder 28ᵃ, tilt the arm 26 upward so as to raise the dog. Assuming, now, that by reason of such engagement and the advance of the dog 27 the arm 28 is moved forward so as to cause the shipper-handle to be tripped to effect the unshipping, the turning movement of the shipper-rockshaft 4 will carry the end of finger 4ᵃ against finger 26ᵃ, tilting the arm 26 upward and raising the dog above shoulder 28ᵃ until it encounters the under side of the lip 28ᶜ. This disengagement of the dog from the shoulder will take place while arm 28 is forward, and will leave such arm free to move rearward to its normal position so as to withdraw the lip 28ᶜ from over the dog 2( and leave the latter free to rise to its highest position under the pressure of finger 4ᵃ against the finger 26ᵃ. As slide 16 moves rearward in the loom, the dog will pass upon the top of the said lip, where it will remain. The fingers 4ᵃ and 26ᵃ also constitute safety-devices for the prevention of accidents such as sometimes happen in the case of automatic weft-replenishing looms employing a change-shaft, as aforesaid, in consequence of the weaver inadvertently tripping the change-shaft into action while engaged in making adjustments, or in repairing warp or web, after having stopped the loom by hand by throwing the shipper-handle. If the weaver, in turning the loom over by hand while thus engaged, should inadvertently trip the change-shaft into action while his attention is occupied with the adjustment or repairs he is making, and the change-shaft should effectuate the replenishment and then in usual manner restart the weaving instrumentalities into action, he might be caught and injured. When the loom is stopped by hand, the dog 27 remains resting upon the top of lip 28ᶜ. On throwing the shipper-handle by hand, the finger 4ᵃ takes a position in which, through engagement with the finger 26ᵃ of the arm 26 carrying the said dog it acts to retain the dog in elevated position, and the dog is thus retained so long as the shipper-handle remains thrown. Consequently, in case the weaver in turning over the loom should bring about an advance of slide 16 and the arms 20 and 26 the dog in advancing will pass entirely above the shoulder 28ᵃ, and the advancing movement of the dog will have no effect in restarting the loom and no harm will result. So long as finger 4ᵃ remains in the position last referred to the dog cannot drop behind the shoulder.

In the weaving of some lines of goods the devices which have just been described, associated with the weft-detector at the driving-side of the loom, may be employed without the addition of the devices at the opposite or magazine-side which I am about to describe, inasmuch as the number of mispicks resulting from breakage or exhaustion of weft will thereby be materially reduced. Even when breakage or exhaustion of weft occurs in the pick from the driving side to the magazine side, there always will be either a partial pick extending through the shed a portion of the width of the cloth, or a full pick extending from selvage to selvage. Following the next pick to the driving side of the loom the fork 15 and associated parts will act in the manner already described. The result will be, either that the shed corresponding with the pick from the driving side to the magazine side will contain a portion of a pick of weft or filling, or the weft-contents of such shed will be complete and perfect. In the first instance the deficiency in the cloth will be inconspicuous; in the other instance the cloth will show no defect whatever, because, the absence of weft or filling being detected on the pick from the magazine side to the driving side, the pick-finding devices at the latter side will operate to remedy the deficiency and cause the production of perfect cloth. I prefer, however, to employ the devices which are herein shown located at the magazine-side, and which are as follows:—30 is the weft-detector (weft-fork) which is located at the magazine-side of the loom. 31 is the carrying-slide of the said weft-detector, and 32 is the guide-stand for the said slide, fixed upon breast-beam 2. The eye of an eye-bolt 33 adjustably applied to the front end of the slide 31 is engaged with a projection 34ᵃ extending transversely from an arm 34 mounted upon the cross-rod or shaft 21, so that as the slide moves forward and rearward in its guide-stand 32 the said arm shall be rocked. The actuator (weft-hammer or goose-neck) for the weft-detector (weft-fork) 30 is shown at 35, and 36ᵃ is the actuating cam for such actuator. Engagement of the shoulder 35ᵃ of the said actuator with the tail of the weft-fork 30 as the actuator is swung forward by the action of its cam 36ᵃ such engagement being permitted in the absence of weft or filling from between the tines of such detector and the grid on the lay as the lay swings forward after the pick of the shuttle from the driving-side of the loom to the side at which fork 30 is located, will rock the arm 34, forward. As the actuator swings rearward again, the slide 31 also is moved in the same direction, and arm 34 is rocked rearwardly, through the action of a contracting spiral spring 36, which has one end thereof engaged with a fixed ear $32^a$ projecting from the rear end of guide-stand 32, and the other end thereof engaged with a screw $34^b$ applied to the projection $34^a$ of the arm 34. Spring 36 holds the slide 31 normally in its rearward position, and the arm 34 drawn rearward close to the front surface of the breast-beam.

The arm 34 constitutes a convenient carrier for a dog 37, and the connection between the slide 32 and the said arm serves as a convenient means of actuating the arm and the dog when the weft-detector 30 indicates weft-deficiency. The said dog is employed for the actuation of devices by means of which the working of the shed-forming tappets or cams $x$, $x$, $x$, $x$, is controlled for pick-finding purposes. The treadles or levers which are actuated by the said tappets or cams are shown at $x'$, $x'$, $x'$, $x'$, and in practice are connected with the harness-frames (not shown) in known manner.

The driving connections of the shed-forming tappets or cams $x$, $x$, $x$, $x$, include clutching devices through which motion is transmitted to the said tappets or cams to cause them to operate the treadles or levers $x'$, $x'$, $x'$, $x'$, and the harness-frames to form and change the sheds, and the detector 30 is operatively combined with the tappets or cams through instrumentalities, including the dog 37, aforesaid, which act under the control of the said detector to occasion a dwell in the action of the tappets or cams by unclutching them temporarily. When such unclutching occurs the tappets or cams remain at rest, and the shed-forming operations are suspended for an interval while other elements of the loom go through their regular cycle of operations, thereby causing the shed-formations to fall behind one stage. The said dog 37 is hung upon a projection $34^a$ projecting outwardly from the arm 34, and is arranged to co-act with an arm 38 which is fixed upon cross-rod or shaft 21, the said arm having a shoulder $38^a$ upon its upper end with which said dog engages at times. A depending portion, 39, of the arm 38, has connected pivotally therewith one end of a connecting-rod 40, the latter extending rearwardly in the loom and having its rear end connected pivotally with an arm 41 fixed upon the transversely-extending shipper-shaft 42. This shipper-shaft also has fixed upon it the clutch-shipper 43 having a working end $43^a$ furnished with a shoulder $43^b$. The clutch-shipper is held normally in inoperative position by means of a torsional spiral spring 44 surrounding a portion of the length of the shaft 42, with one end thereof engaged with the adjacent loom-side 1 and the other engaged with a collar 45 which is fixed upon the shaft. The spring serves to restore the clutch-shipper to its normal inoperative position, after it has been caused to assume its working position through the action of the detector 30 and the intermediate devices which have been described. The tappets or cams $x$, $x$, $x$, $x$, are fixed upon the jack-shaft $w$, and the jack-shaft and its tappets or cams are driven from the cam-shaft $v$ by means of the spur-gear $w'$ fixed upon the jack-shaft, the spur-pinion $v'$ loose upon the cam-shaft, and the clutching devices. The clutching devices comprise the disk 46 which is fixed upon cam-shaft $v$ and formed with oppositely-located notches in its periphery, the clutching-arms 47, 47, which are pivotally hung upon the opposite arms of a carrier 48 that is fixedly connected with pinion $v'$, a rod 49 joining the said clutching arms together and having its respective ends pivotally engaged with the clutching-arms at different sides of their pivots, as shown in Fig. 1, so that the said clutching-arms open and close simultaneously, and contracting spiral springs 50, 50, each engaged by one end thereof with one of the clutching-arms and by the other end thereof with the carrier 48, the said springs operating to draw the clutching-arms toward the disk 46, and to cause the teeth or projections of the clutching-arms to enter the notches of such disk and remain therein. So long as the said teeth or projections occupy the said notches, the spur-pinion $v'$ is clutched to cam-shaft $v$, and transmits rotary motion to spur-gear $w'$ and the jack-shaft and its tappets or cams $x$, $x$, $x$, $x$. Should, however, the clutch-shipper be moved so as to swing its working end into the path of rotation of the lateral projections 51, 51, of the clutching-arms 47, 47, the particular projection 51 which encounters such working end will be detained through its engagement with the said working end and its shoulder $43^b$ with the effect of opening the two clutching-arms outward so as to disengage their teeth or projections from the disk 46, thereby unclutching the spur-pinion $v'$, and arresting its rotaion and that of the jack-shaft and the shedding-tappets or cams until the clutch-shipper is withdrawn and the springs 50, 50, have acted to draw the teeth or projections of the clutching-arms into the notches of disk 46 again as such notches come around in the continued rotation of the disk with the cam-shaft.

The actuating cam $36^a$ of the actuator (weft-hammer or gooseneck) 35 is shown separately in Fig. 8, Sheet 1. Its timing and dwell are such that in case the said actuator, in being advanced by the said cam, should engage with the tail of the detector (weft-fork) 30 and move the slide 31 forward in the loom, the dog 37 being permitted to engage with the shoulder 38ª of arm 38 and rock that arm so as to cause the clutch-shipper to assume its position for opening the clutch, namely, with its working end intersecting the circle in which the projections 51, 51, rotate, the clutch-shipper will be retained in such position long enough to be struck by a projection 51 and to open the clutch and hold the tappets or cams $x$, $x$, $x$, $x$, from rotation, until the notches of disk 46 have passed away from the teeth or projections of clutching-arms 47, 47. The clutch-shipper will then be permitted to resume its normal inoperative position, disengaged from the projection 51 which encountered it, so that as the next notches of the disk 46 come around the teeth or projections of clutching-arms 47, 47, may snap into them, again clutching the shedding tappets or cams to their driving-connections to cause them to resume their rotation.

From the preceding description it will be clear that the dog 27 is actuated under the control of the detector 15 to trip the loom-shipper to arrest the weaving action, and also trip the weft-replenishing instrumentalities into action, and that the dog 37 is actuated under the control of the detector 30 to trip the clutch-devices of the shedding tappets or cams to cause a dwell in the formation of sheds in the warps.

The engagement of the dog 37 with the shoulder 38ª to actuate such arm is controlled at times by the detector 15 at the driving-side of the loom through connections comprising a finger 55 which is fixed upon a cross-rod or shaft 56 extending across the front of the loom and mounted in bearings which are provided in the stands 11ª and 22. The said finger extends up in front of a portion of arm 20 and normally presses thereagainst. The rod or shaft also has fixed thereon, at the opposite side of the loom, a second finger, 57, extending up therefrom behind a pin 58 projecting laterally inward from the depending tail of dog 37. Forward movement of slide 16 and arm 20, at the driving-side of the loom, causing the said arm to press finger 55 forward, acts to turn cross-rod or shaft 56 so as to swing the finger 57 forward, to tilt the dog 37 upward so that it will pass over the shoulder 38ª of arm 38 without engaging therewith when the slide 31 is caused to advance. To hold the dog in uptilted position until the advance of slide 31 takes place, a latch 59 is provided, hung loosely upon the cross-rod or shaft 21. This latch normally rests upon a pin 60 projecting from the tail of dog 37. When the dog is tilted as referred to above, the engaging portion of the latch engages with the said pin to hold the tail forward and thereby keep the dog uptilted for the time being, notwithstanding the fact that the return rearward movement of slide 16 permits fingers 55 and 57, and cross-shaft 56, to turn rearwardly back into their normal positions again. Arm 38 is furnished with a pin or projection 61 projecting laterally inward below the latch 59 to prevent it from dropping below a certain height when not otherwise supported, and with a similar pin or projection 62 above the latch to prevent the latter from flying up too far. The latch is formed with a curved nose which rests upon the pin 60, when the latter passes in front of the shoulder of the latch.

For the purpose of arresting the taking-up action, and letting-back, the cross-rod or shaft 56 has fixed upon the end thereof at the driving-side a rearwardly-projecting arm 63, to which is connected pivotally the upper end of a link 64 having its lower end connected pivotally with the bearing 40 for the forward end of the take-up shaft 8. The forward rocking movement of the cross-rod or shaft 56 acts through the said arm and link to raise the bearing so as to disengage the worm 7 from the teeth of the take-up worm-gear 6, thereby arresting the taking-up, and permitting such gear to recoil to the extent allowed by the let-back pawl 9, thereby letting-back. It already has been explained that at the driving-side of the loom the arm 55 which is fixed upon the said cross-rod or shaft has its upper end extended into position to engage with arm 20, so that forward movement of the slide 16 and said arm 20 shall cause the latter to press the arm 55 forward, thereby turning the cross-rod or shaft 56 in the same direction. A finger 65 fixed on cross-rod or shaft 21 extends up behind a projection 66 extending laterally inward from arm 55, so that whenever the cross-rod or shaft 21 is rocked forwardly through the engagement of dog 37 with shoulder 38ª of the arm 38 fixed upon cross-rod or shaft 21, as slide 31 and arm 34 at the magazine-side of the loom are advanced, the pressure of the said finger 65 against the said projection 66, causes the cross-rod or shaft 56 to be rocked.

The action of the complete assemblage which has now been described is as follows:—Assuming that weft-deficiency is ascertained following the pick toward the driving-side of the loom, which will be counted as pick No. 1, the shed through which such pick is made being counted as shed No. 1, the actuator 18 engages the tail of weft-fork 15 and advances slide 16. Thereby arm 20 is advanced, advancing with it the dog 27 and the arm 55. The advance of the said dog causes it to pass forward off the lip 28ᶜ, so that it drops upon the top of the nose of the arm 28, while that of arm 55 causes cross-rod or shaft 56 to be rocked.

This rocking disengages the actuating worm 7 of the take-up, arresting the taking-up action and permitting the cloth to let back. It also causes the finger 57 at the magazine-side of the loom to act against pin 58, pressing forward the tail of dog 37, whereupon latch 59 engages with pin or stud 60 upon the said tail to keep the dog 37 in its uplifted position. Thereby dog 37 is rendered inoperative, temporarily. As slide 16 recedes, the dog 27 moves back under the tip 28ᶜ, dropping into the pocket 28ᵇ behind the shoulder 28ᵃ. The arm 55, cross-rod or shaft 56, and finger 57 are permitted to turn reversely. Thereby the take-up worm 7 is lowered into engagement with the worm-gear 6, but the dog 37 remains latched in uplifted position, with its acting end above the shoulder 38ᵃ of arm 38. Following the succeeding pick from the driving-side to the magazine-side, which is the second pick of the count and the shed through which it is made being shed No. 2, the engagement of actuator 35 with weft-fork 30 produces the advance of slide 31 at the magazine-side, and that of arm 34 and dog 37. In consequence of being latched in uplifted position, as just explained, the said dog passes over the shoulder 38ᵃ of the arm 38 and makes its advance without engaging the said shoulder. By the forward swing of the arm 34 the pin 60 (of the tail of the said dog) is carried downward, and as the latch 59 is limited as to its descent by means of the stop-pin 61, Fig. 2, the continued downward movement of the pin 60 after the latch has taken bearing upon the said stop-pin disengages the pin 60 from the shoulder of the latch, whereupon gravity causes the dog to swing around its support at 34ᵃ so as to lower its acting end. The dwell-portion of cam 36ᵃ operates to hold the slide 31 and connected parts forward while the actuator 18 at the driving-side advances slide 16 following the succeeding pick to the driving-side, which is the third pick of the count, the shed through which it is made being shed No. 3. In this advance of slide 16 and of the arm 20 and dog 27, the arm 55 is pressed forward again, rocking the cross-rod or shaft 56, and this time the dog 27 engages the shoulder 28ᵃ of arm 28, turning the latter arm forward. The turning of arm 28 trips the weft-replenishing instrumentalities into action and also trips the shipper-devices to arrest the weaving action, and that of cross-rod or shaft 56 lifts the take-up worm out of gear again, and in addition causes finger 57 to tilt the dog 34 into its uplifted inoperative position, wherein it is latched by the latch 59. Both slides 16 and 31, and the connected parts, move rearwardly in unison. The receding movement of the slide 16 permits the cross-rod or shaft 56 to turn reversely, so that the take-up worm 7 is lowered into engagement with the worm-gear 6 once more. Following the pick from the driving-side to the magazine-side resulting from the overthrow or momentum of the loom, which is the fourth pick of the count, the shed through which it is made being shed No. 4, the loom comes to rest with the shuttle in the shuttle-box at the magazine-side, in readiness for replenishment, with the actuator 35 at the magazine-side in readiness to act. Following replenishment, and the ensuing pick of the shuttle from the magazine-side through the fifth shed, which is a reopening of the shed in which weft-deficiency was observed as described above, the said actuator 35 advances and by its engagement with weft-fork 30 advances slide 31, arm 34, and dog 37. Dog 37, in consequence of being latched in its uplifted position, is inoperative, and its acting end moves forward idly over the shoulder 38ᵃ of arm 38. This advance of arm 34 and the dog causes the pin 60 of the tail of the dog to become disengaged from latch 59 as before, and when slide 31 and arm 34 recede the dog and other parts resume their normal positions. The regular working of the loom now proceeds.

Should weft-deficiency be detected after the pick from the driving-side of the loom to the magazine-side thereof, which will be the first pick of the count, the shed through which it is made being shed No. 1, the actuator 35 through its engagement with weft-fork 30 will occasion the advance of slide 31, arm 34, and dog 37. Dog 37 through its engagement with the shoulder 38ᵃ of arm 38 rocks forwardly the arm 38 and the cross-rod or shaft 56. This brings about the lifting of the take-up worm, and the letting-back, and also moves the clutch-shipper 43 for the clutching-devices of the shedding-tappets or cams into working position, namely into the path of rotation of the projections 51, 51, of the members 47, 47, of the said clutching-devices. The particular projection 51 which engages the said working end of the clutch-shipper will be detained thereby, opening the clutch, and causing the said tappets or cams to become disconnected from the cam-shaft of the loom, while the picking continues. This disconnection will cause a dwell in the shed-formations for an interval corresponding with one pick, as already explained. When the slide 31 recedes, the clutch-shipper will move out of engagement with the projection 51 which it held, thereby permitting the clutch to close so as to clutch the shedding tappets or cams to the cam-shaft again for regular operation. Following the return pick from the magazine-side to the driving-side, which is the second pick of the count, the slide 16 is advanced, initiating the round of operations that were performed, as described above, on the detection of weft-deficiency originally on the pick to the driving-side, such operations taking place in the manner which has been explained, the tripping action being caused to occur following the fourth pick of the count, and the suspension of the weaving action taking place after the fifth pick, which latter lands the shuttle in the shuttle-box at the magazine-side in readiness for the replenishment. By retarding the shed-formations one stage, they are timed so that the fifth pick takes place through the fourth shed. Consequently, when weaving is resumed after replenishment, the first pick will be through a reopening of the first shed.

Figs. 9 to 15 show devices contrived to automatically unlatch the dog 37 and effect its release in case it should happen to be raised into its elevated inoperative position by the weaver for some proper purpose, or through mistake, or by accident as in consequence of being struck, or of shocks and jars incident to the working of the loom, and should remain latched in such position at the wrong time through the engagement of latch 59 with the pin 60. Such release is desirable in order to insure the contemplated action of the shed-controlling devices at the magazine-side of the loom in case of the detection of weft-deficiency in the pick toward that side. The said devices also effect at the required time during the pick-finding operations, or count, the unlatching of such dog after it has been raised by means of the finger 57 through the action of the devices at the driving-side of the loom, and has been properly latched.

In the figures last mentioned, the latch, therein designated 59ª, is furnished with an upward extension carrying a stud or projection 59ᵇ extending laterally outward. A disengaging lever 59ᶜ is mounted pivotally at 59ᵈ upon arm 38, the said lever having a depending arm formed with a concave working face adapted to engage with the said stud or projection of the latch when such arm is swung rearwardly. Pressure of the said concave working face rearward against the stud or projection will operate to lift the latch, and if when this occurs the dog occupies an elevated inoperative position through the engagement of the shoulder of the latch with the pin 60 the lifting of the latch will release the dog, permitting it to drop into working position ready to engage with the shoulder 38ª of arm 38. The disengaging lever 59ᶜ has connected thereto one end of a contracting spiral spring 59ᵉ, the other end of which is connected to the screw 38ᵇ which fixes the arm 38 upon cross-rod or shaft 21, and the said spring acts with a tendency to keep the disengaging lever in its normal position, with a stop-projection 59ᶠ on the lever in contact with the front edge of arm 38, and with the concave working arm forward so as to leave the latch free to swing. The disengaging lever is actuated by means of actuator 35, through a bar 59ᵍ having one end thereof in pivotal connection with the disengaging lever and the other end thereof, which rests and slides upon the top of slide 31, disposed in the path of the said actuator. When the actuator 35 in its forward movement encounters the rear end of bar 59ᵍ it pushes the latter ahead, rocking the disengaging lever so that the said lever by its concaved working arm acts against the pin or stud of the latch 59ª to raise such latch. If the latch has been in engagement with pin 60 and holding the dog 37 in inoperative position, this raising of the latch releases the pin and dog, permitting the dog to assume its working position. Connection between the forward end of the bar 59ᵍ and the disengaging lever is effected by means of a pin 59ʰ having both end-portions thereof reduced in diameter. One of such end-portions is smooth and constitutes a journal which fits and turns in a bearing formed in the upwardly-extending arm of the disengaging lever. The other thereof is screw-threaded. It projects through a hole in the bar, and receives at the inner side of the bar a nut 59ⁱ which clamps the bar against the adjacent shoulder of the pin. The hole is elongated lengthwise of the bar, to enable the bar to be adjusted in the direction of its length so that its rear end will be encountered by the actuator 35 earlier or later in its advancing stroke, as may be required, to vary the extent of the acting stroke of the disengaging lever. Thereby each advance of the actuator 35 operates to lift the latch, except when the slide 31 is advanced and through the dog 37 also advances the arm 38. In this case the disengaging lever goes forward bodily with the said arm, leaving the latch free. The latch 59ª is furnished with a hook 59ᵏ which catches the pin 60 to prevent too great an extent of upward turning movement of the dog 37.

What is claimed is:—

1. In pick-finder devices for looms, in combination, a tripping device and a member in connection therewith having a shoulder and lip, a dog which engages normally with the said lip and thereby is kept from engaging with the shoulder on the primary stroke of the dog, and which clears said lip in making the return, and engages the shoulder and actuates the tripping-device on a succeeding stroke, and weft-detector devices which occasion successive advances of the dog when weft-deficiency is detected.

2. In pick-finder devices for looms, in combination, a tripping device and a member in connection therewith having a shoulder and lip, a dog which engages normally with the said lip and thereby is kept from engaging with the shoulder on the primary stroke of the dog, and which clears said lip in making the return, and engages the shoulder and actuates the tripping device on a succeeding stroke, weft-detector devices which occasion successive advances of the dog when weft-deficiency is detected, and automatic means for restoring the dog to its normal position in connection with the lip.

3. In pick-finder devices for looms, in combination, a tripping device and a member in connection therewith having a shoulder and lip, a dog which engages normally with the said lip and thereby is kept from engaging with the shoulder on the primary stroke of the dog, and which clears said lip in making the return, and engages the shoulder and actuates the tripping-device on a succeeding stroke, weft-detector devices which occasion successive advances of the dog when weft-deficiency is detected, and a shipper-device which is thrown by the said tripping device to bring about the required change in the working of the loom, and by which the dog is restored to its normal position in connection with the lip.

4. In pick-finder devices for looms, in combination, the tripping rockshaft and the arm provided with shoulder and lip, the dog which rests normally upon the lip, and the weft-detector slide by which the said dog is operated.

5. In pick-finder devices for looms, in combination, the tripping rockshaft and the arm provided with shoulder and lip, the dog which rests normally upon the lip, the weft-detector slide by which the dog is actuated, and a shipper-device which is thrown by the said rock-shaft and by which the dog is restored to its normal position upon the lip.

6. In pick-finder devices for looms, in combination, a tripping device and a member in connection therewith having a shoulder and lip, a dog which engages normally with the said lip and thereby is kept from engaging with the shoulder on the primary stroke of the dog, and which clears said lip in making the return and engages the shoulder and actuates the tripping device on a succeeding stroke, weft-detecting devices which occasion successive advances of the dog when weft-deficiency is detected at time of picks in one direction, shed-forming devices, and means under control of the weft-detector devices acting in case of primary detection of weft-deficiency at time of a pick in the opposite direction to alter the time-relation of the shed-formations.

7. In pick-finder devices for looms, in combination, a tripping device and a member in connection therewith having a shoulder and lip, a dog which engages normally with the said lip and thereby is kept from engaging with the shoulder on the primary stroke of the dog, and which clears said lip in making the return and engages the shoulder and actuates the tripping device on a succeeding stroke, weft-detector devices which occasion successive advances of the dog when weft-deficiency is detected at time of picks in one direction, shed-forming devices, means under control of the weft-detector devices acting in case of primary detection of weft-deficiency at time of a pick in the opposite direction to alter the time-relation of the shed-formations, and devices whereby primary detection of weft-deficiency at time of a pick in the first direction renders the said means ineffective to alter the time-relation.

8. In pick-finder devices for looms, in combination, a tripping-device and a member in connection therewith having a shoulder and lip, a dog which engages normally with the said lip and thereby is kept from engaging with the shoulder on the primary stroke of the dog, and which clears said lip in making the return and engages the shoulder and actuates the tripping device on a succeeding stroke, weft-detector devices which occasion successive advances of the dog when weft-deficiency is detected at time of picks in one direction, shed-forming devices, a clutch-shipper for the shed-forming devices, a dog actuated by the weft-detector devices in case of detection of weft-deficiency at time of a pick in the opposite direction, devices adapted to be engaged and actuated by the latter dog to move the said clutch-shipper, and devices whereby primary detection of weft-deficiency at time of a pick in the first direction renders the latter dog ineffective to move the clutch-shipper.

9. In pick-finder devices for looms, in combination, a tripping device by which the desired change in the working of a loom is called, weft-detector devices detecting for picks in the respective directions, means under control of the said weft-detector devices acting on detection of weft-deficiency at time of a pick in a given direction to actuate the tripping device after retardation for a predetermined number of picks, to produce the said change with timing fixed in relation to a reopening of the corresponding shed, shed-forming devices, a clutch-shipper for the shed-forming devices, a dog actuated by the weft-detector devices in case of detection of weft-deficiency at time of a pick in the opposite direction, devices adapted to be engaged and operated by the said dog to move the said clutch-shipper to alter the time-relation of the shed-formations, and devices whereby primary detection of weft-deficiency at time of a pick in the first direction renders the said dog ineffective to move the clutch-shipper.

10. In pick-finder devices for looms, in combination, a weft-fork slide, a dog actuated thereby, shed-forming devices, a clutch-shipper for the said shed-forming devices, and a device in operative connection with said clutch-shipper and adapted to be engaged and operated by the said dog to actuate the clutch-shipper when the dog is actuated by the said weft-fork slide.

11. In pick-finder devices for looms, in combination, opposite weft-fork slides, a dog in connection with each slide and actuated by the movement of the latter, a tripping device actuated by one of the said dogs after retardation for a predetermined number of picks, shed-forming devices, a clutch-shipper for the shed-forming devices actuated through the other dog in case of primary detection of weft-deficiency at time of a pick in one direction, and means operating to render the latter dog ineffective to actuate the clutch-shipper in case of primary detection of weft-deficiency, at time of a pick in the opposite direction.

12. In pick-finder devices for looms, in combination, two weft-fork slides, a dog actuated by one of such slides, a latch for engagement with said dog to hold it in inoperative position, means operated by the other slide to cause the dog to become latched in the said position, and means for automatically unlatching the dog.

13. In pick-finder devices for looms, in combination, two weft-fork slides, a dog actuated by one of such slides, means operated by the other slide to move the dog into inoperative position, a latch to hold the dog in such position, a lever for disengaging the latch from the dog, a weft-hammer or gooseneck, and a bar actuated thereby to operate the said disengaging lever.

14. In pick-finder devices for looms, in combination, two weft-fork slides, a dog actuated by one of such slides, a movable member adapted to be engaged and moved by the said dog, shed-forming devices, a clutch-shipper for the shed-forming devices, operatively combined with the said movable member, means operated by the other slide to move the dog into inoperative position, a latch to hold the dog in such position, a latch-disengaging device mounted upon the said movable member, and a weft-hammer or gooseneck actuating the said device to effect the disengagement of the latch.

15. In pick-finder devices for looms, in combination, shed-forming tappets or cams, driving-means therefor including a clutch normally-closed, a clutch-shipper normally disengaged from the clutch-members and movable into position for engagement with the clutch-members and as a result of engagement therewith acting to unclutch the tappets or cams and arrest the rotation thereof, a weft-fork slide, and means operated thereby and by which the clutch-shipper is moved into position to act as stated.

16. Pickfinder devices comprising, in combination, a weft-detector detecting for picks in one direction, a dog actuated under the control of the said detector, a tripping device actuated by the said dog, means for retarding the actuation of the tripping device by the dog, shed-forming devices, a weft-detector detecting for picks in the opposite direction, and means under control of the latter detector to effect a compensating adjustment of the shed-forming devices in case weft-failure is detected first by such detector.

In testimony whereof I affix my signature in presence of two witnesses.

SIMEON SCHOON JACKSON.

Witnesses:
   CHAS. F. RANDALL,
   EDITH J. ANDERSON.

---

Copies of this patent may be obtained for five cents each, by addressing the "Commissioner of Patents, Washington, D. C."